United States Patent [19]

Thomas

[11] 4,433,341

[45] Feb. 21, 1984

[54] INK LEVEL CONTROL FOR INK JET PRINTER

[75] Inventor: Jacob E. Thomas, Ithaca, N.Y.

[73] Assignee: NCR Corporation, Dayton, Ohio

[21] Appl. No.: 385,965

[22] Filed: Jun. 7, 1982

[51] Int. Cl.[3] .............................................. G01D 15/18

[52] U.S. Cl. .............................................. 346/140 R

[58] Field of Search ............... 346/140 R, 140 PD, 75

[56] References Cited

U.S. PATENT DOCUMENTS 4,340,896 7/1982 Cruz-Uribe et al. ......... 346/140 PD 4,394,669 7/1983 Ozawa et al. ..................... 346/75 X

*Primary Examiner*—George H. Miller, Jr.

*Attorney, Agent, or Firm*—J. T. Cavender; Wilbert Hawk, Jr.; George J. Muckenthaler

[57] ABSTRACT

The level of ink in a reciprocating reservoir is automatically controlled for both printing and non-printing conditions. The reciprocating motion creates forces to cause the ink to move back and forth between the reciprocating reservoir and a main stationary reservoir and to maintain the ink at one level during printing. A check valve controls direction and flow of ink moving between the reservoirs and allows the ink to rise in the first-mentioned reservoir during non-printing.

18 Claims, 1 Drawing Figure

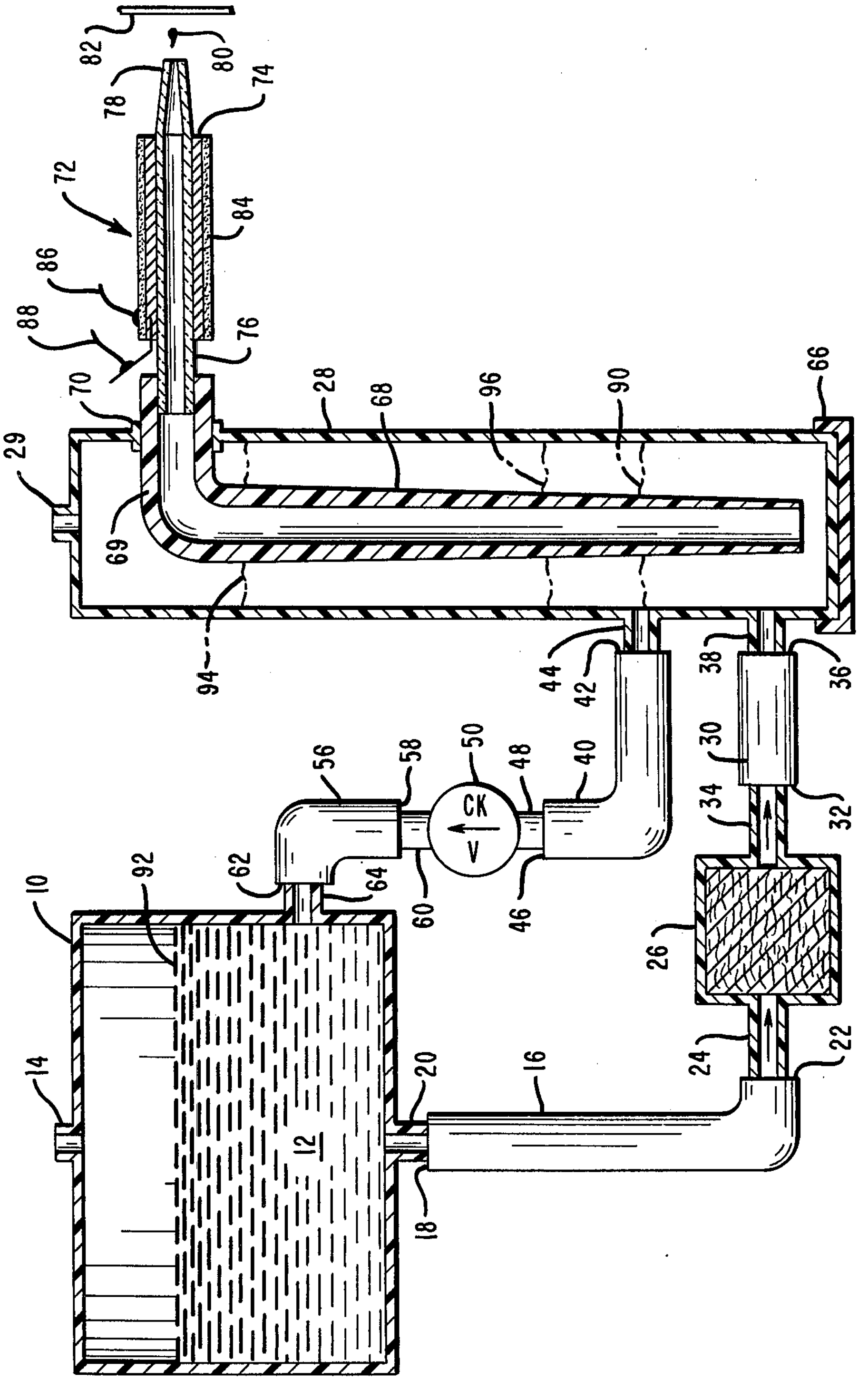
82
80
78
74
72
84
86
88
76
70
29
28
68
96
90
66
69
94
44
42
38
36
30
40
50
48
58
56
CK
V
34
32
62
64
60
46
10
92
26
14
20
16
24
22
12
18

INK LEVEL CONTROL FOR INK JET PRINTER

CROSS-REFERENCE TO RELATED APPLICATIONS

Ink Evaporation Prevention Means For Ink Jet Printer, co-pending application Ser. No. 385,956, now U.S. Pat. No. 4,412,233, filed on even date herewith, invented by Jacob E. Thomas and James K. McKnight, and assigned to NCR Corporation.

Ink Level Control For Ink Jet Printer, co-pending application Ser. No. 385,955, filed on even date herewith, invented by Richard G. Bangs and Jacob E. Thomas, and assigned to NCR Corporation.

Ink Control For Ink Jet Printer, co-pending application Ser. No. 385,966, now U.S. Pat. No. 4,418,353, filed on even date herewith, invented by Jacob E. Thomas, and assigned to NCR Corporation.

Ink Control For Ink Jet Printer, co-pending application Ser. No. 385,967, filed on even date herewith, invented by Jacob E. Thomas, and assigned to NCR Corporation.

BACKGROUND OF THE INVENTION

In the field of non-impact printing, the most common types of printers have been the thermal printer and the ink jet printer. When the performance of a non-impact printer is compared with that of an impact printer, one of the problems in the non-impact machine has been the control of the printing operation. As is well-known, the impact operation depends upon the movement of impact members, such as print hammers or wires or the like, which are typically moved by means of an electromechanical system and which may, in certain applications, enable a more precise control of the impact members.

The advent of non-impact printing, as in the case of thermal printing, brought out the fact that the heating cycle must be controlled in a manner to obtain maximum repeated operations. Likewise, the control of ink jet printing, in at least one form thereof, must deal with rapid starting and stopping movement of the ink fluid from a supply of the fluid. In each case of non-impact printing, the precise control of the thermal elements and of the ink droplets is necessary to provide for both correct and high-speed printing.

In the matter of ink jet printing, it is extremely important that the control of the ink droplets be both precise and accurate from the time of formation of the droplets to depositing of such droplets on paper or like record media and to make certain that a clean printed character results from the ink droplets. While the method of printing with ink droplets may be performed in either a continuous manner or in a demand pulse manner, the latter type method and operation is disclosed and is preferred in the present application when applying the features of the present invention. The drive means for the ink droplets is generally in the form of a well-known crystal or piezoelectric type element to provide the high-speed operation for ejecting the ink through the nozzle while allowing time between droplets for proper operation. The ink nozzle construction must be of a nature to permit fast and clean ejection of ink droplets from the print head.

In the ink jet printer, the print head structure may be a multiple nozzle type with the nozzles aligned in a vertical line and supported on a print head carriage which is caused to be moved or driven in a horizontal direction for printing in line manner.

Alternatively, the printer structure may include a plurality of equally-spaced, horizontally-aligned, single nozzle print heads which are caused to be moved in back-and-forth manner to print successive lines of dots in making up the lines of characters. In this latter arrangement, the drive elements or transducers are individually supported along a line of printing.

In a still different structure, the nozzles are spaced in both horizontal and vertical directions, and the vertical distance between centers of the ink jets equals the desired vertical distance between one dot and the next adjacent dot above or below the one dot on the paper. The horizontal distance is chosen to be as small as mechanically convenient without causing interference between the actuators, reservoirs, and feed tubes associated with the individual jets. The axes of all jets are aligned approximately parallel to each other and approximately perpendicular to the paper. Thus, if all nozzles were simultaneously actuated, a sloped or slanted row of dots would appear on the paper and show the dots spaced both horizontally and vertically. In order to produce a useful result consisting of dots arranged as characters, it is necessary to sweep the ink jet head array back and forth across the paper, and actuate each individual nozzle separately when it is properly located to lay down a dot in the desired position. A vertical row of dots is created by sequentially actuating the nozzles rather than simultaneous actuation, the latter being the preferred practice in the more common nozzle arrangements.

A further observation in ink jet printers is that previous and current designs for drop-on-demand ink jet print heads are sensitive to the ingestion of air into or the presence of air in the supply of ink. Even a small air bubble can interrupt or fault the performance of transducers or like devices that expel ink droplets from a nozzle by means of pressure pulses created within an ink-filled chamber or channel.

The use of a fast-acting valve to control the flow of ink to a single ink jet printing nozzle is known in specific applications, but in certain cases, the concept and heretofore-known structure has been considered costly and impractical. Additionally, the supply of ink to a plurality of ink jet nozzles may be controlled by means of a single control device wherein the nozzles are connected to a common manifold and ink droplet ejection is accomplished by momentarily increasing the pressure in the manifold.

After the droplets of ink have been ejected from the nozzles, the ink is replenished thereat from a remote supply by the capillary action of the meniscus at the end of the nozzle. In certain of the control devices and arrangements, it has been found that some difficulties arise from the capillary action refill or replenish process and there are adverse effects on the performance and reliability of such printers.

In normal operation of an ink jet print head, it is well-known that a negative meniscus of ink should be maintained at the nozzle, that the relative levels of ink in the various parts or areas of the system have an effect on the printing operation, and further, that the movement of the several printer elements affects the flow of ink during the printing cycle.

Representative documentation in the field of ink control means for ink jet printers includes U.S. Pat. No. 3,805,276, issued to H. Ishii on Apr. 16, 1974, which discloses ink jet recording apparatus having an ink pump and wherein a valve is associated with a supplementary ink holder, a temporary ink receptacle and the nozzle in an arrangement for removal of air from the ink during a non-printing period.

U.S. Pat. No. 4,038,667, issued to S. L. Hou et al. on July 26, 1977, discloses a pressurized ink jet supply system for an array of ink jets wherein an on-off valve is interposed in the conduit between the ink reservoir and the nozzles, and a second valve is positioned in a line between a second source of ink under pressure and the conduit in an arrangement to reprime for printing operation or to purge the system.

U.S. Pat. No. 4,084,165, issued to B. Skafvenstedt on Apr. 11, 1978, discloses a fluid jet writing system having a pump, a reservoir and a valve along with a comparator in the hydraulic circuit for maintaining a predetermined fluid pressure in the fluid supply line between the pump and the valve by controlling the operation of the pump.

U.S. Pat. No. 4,095,237, issued to J. R. Amberntsson et al. on June 13, 1978, discloses an ink jet print head which has an ink reservoir that follows the movement of the print head, and includes a filter in the liquid flow path.

U.S. Pat. No. 4,126,868, issued to W. Kirner on Nov. 21, 1978, discloses an air venting device for ink supply systems wherein a reservoir supplies ink to a manifold or capillary tube and then to the nozzles. An air bleed passageway communicating with the reservoir has a predetermined small diameter to produce a capillary effect.

U.S. Pat. No. 4,152,710, issued to M. Matsuba et al. on May 1, 1979, discloses an electromagnetic cross valve provided for selectively connecting a nozzle with an ink liquid supply conduit and an ink liquid drain conduit for control of ink level in the system.

U.S. Pat. No. 4,215,350, issued to K. H. Mielke et al. on July 29, 1980, discloses ink jet printing apparatus with different ink jet spacings wherein each of the nozzles is connected through a solenoid valve to an ink supply and each valve is controlled by a pattern generator which timely selects valves and causes simultaneous pulses to be supplied to the selected valves.

U.S. Pat. No. 4,287,523, issued to J. E. Thomas et al. on Sept. 1, 1981, discloses a ball valve for a rotary ink jet printer and positioned in an arrangement to control the ink flow from one chamber to another chamber.

U.S. Pat. No. 4,323,907, issued to V. J. Italiano on Apr. 6, 1982, discloses a ball valve which is affected by inertia to open and close an ink line from a reservoir to a plurality of ink jet heads.

And, United States application, Ser. No. 342,256, filed Jan. 25, 1982, and assigned to the same assignee as the present invention, discloses a ball valve actuated in electromagnetic manner to cause droplets of ink to be ejected onto record media.

SUMMARY OF THE INVENTION

The present invention relates to ink jet printers, and more particularly, to control means which includes a check valve provided in one line between an ink supply tank and a second tank carrying an ink jet nozzle. The ink supply system provides a main reservoir which is stationary and vented to the atmosphere, and a local reservoir which is carried on a carriage movable in back-and-forth manner relative to paper or like record media. The local reservoir has at least one print head supported from and carried therewith in reciprocating manner during the printing operation.

The ink is caused to flow from the main reservoir through a tube having a constriction device for preventing or minimizing surges of ink into the local reservoir. A filter is also included in the constriction device for continuous filtration of the ink. An ink return line from the local reservoir to the main reservoir includes a check valve intermittently operated to control flow of ink therebetween and establish ink in the local reservoir at two levels under two conditions.

The apparatus and arrangement provides for controlling or maintaining the level of ink at or near the inlet height of the return line or tube when the carriage along with the reservoir is reciprocating in a printing condition or operation, and then allowing the ink level to rise to the level of the ink in the main reservoir or approximately to the height of the ink jet print head nozzle when the reservoir along with the print head is idle or in the non-printing condition.

In view of the above discussion, the principal object of the present invention is to provide means permitting controlled amounts of ink to flow between separate reservoirs in an arrangement to be used for marking or printing on record media.

Another object of the present invention is to provide means for controlling flow of ink from a supply thereof to at least one ink jet nozzle.

An additional object of the present invention is to provide means for controlling flow of ink between a main reservoir and a reciprocating reservoir carrying an ink jet print head.

A further object of the present invention is to provide a main reservoir and a local reservoir of ink along with control means therebetween for maintaining the ink in the reservoirs at predetermined levels during both printing conditions and non-printing conditions.

Additional advantages and features of the present invention will become apparent and fully understood from a reading of the following description taken together with the annexed drawing.

BRIEF DESCRIPTION OF THE DRAWING

The single FIGURE is a diagrammatic view, partly in section, of a printing system incorporating the subject matter of the present invention.

DESCRIPTION OF THE PREFERRED EMBODIMENT

As seen in the single FIGURE of the drawing, an ink reservoir 10 contains a supply of printing ink 12 which is sufficient for printing in excess of several million characters. The reservoir has a filter-type vent 14 suitably disposed in the top thereof for access to the atmosphere. A length of flexible tubing 16 is connected at one end 18 thereof to the outlet 20 of the reservoir 10 and is connected at the other end 22 thereof to an inlet 24 of a constricting-type device 26 which is formed of suitable material to dampen or impede the flow of ink from the main or remote reservoir 10 to a second or local reservoir 28. The reservoir 28 also has a filter-type vent 29 disposed in the top thereof. A second flexible tube 30 is connected at one end 32 thereof to an outlet 34 of the device 26 and is connected at the other end 36 to an inlet 38 of the reservoir 28. The tubes 16 and 30 provide an ink supply passageway for flow of ink from the main reservoir 10 to the device 26 and from such device to the local reservoir 28.

A return path for the flow of ink is provided from the reservoir 28 to the resevoir 10. A flexible tube 40 is connected at one end 42 thereof to an outlet 44 (above the inlet 38) of the reservoir 28 and is connected at the other end 46 thereof to the inlet 48 of a normally-closed, pressure actuated check valve 50 which is suitable for allowing ink to flow from the reservoir 28 to the reservoir 10 during normal printing operation. The check valve 50 may be a common and well-known type which includes a ball operably associated with a valve seat for permitting intermittent flow of ink through the valve from the reservoir 28 to the reservoir 10 upon reciprocating movement of the reservoir 28 as described hereinafter. A flexible tube 56 is connected at one end 58 thereof to the outlet 60 of the check valve 50 and is connected at the other end 62 thereof to an inlet 64 of the reservoir 10.

The secondary or local reservoir 28 is secured to or supported from a movable carriage 66 which causes the reservoir to be moved in reciprocating manner in a direction to and from the observer, as viewed in the drawing. Such reciprocating movement of the reservoir 28 results in increased ink pressure therein and thus intermittently operates said check valve 50 upon each acceleration portion of such movement. A feed tube 68, of a length and extending from near the bottom of the reservoir 28 to a height which is above the normal level of ink in the main reservoir 10, includes an upper outlet portion 69 which extends through a wall portion or grommet 70 of the reservoir 28 to an ink jet print head 72. The several tubes utilized in the system may be made of Tygon (a polyvinyl chloride material manufactured by The Norton Chemical Company).

The print head 72 includes a body portion 74 of cylindrical form having a glass tube or glass-lined passageway 76 through the body portion for receiving and connecting to the feed tube portion 69 and terminating in a nozzle 78 for ejecting a droplet 80 of printing ink to be applied to record media 82, which media may be in the form of paper or the like and supported in suitable manner around a drum or from a platen (not shown).

The print head 72 may be of a type as disclosed in Arndt U.S. Pat. No. 3,832,579, appropriate for and commonly used in ink jet printing operations, and which includes a piezoelectric device or tubular type transducer 84 for causing ejection of the ink droplets 80, either in synchronous or asynchronous manner, from the print head nozzle 78. The ink droplets 80, so produced from the nozzle 78, are essentially the same or constant in size and are normally ejected at a constant velocity. Leads 86 and 88 are appropriately connected to the print head 72 for actuating the transducer 84 so as to cause ejection of the ink droplets 80 in well-known manner.

In the operation of the printing system, the reservoir 28 is caused to be moved by the reciprocating motion of the carriage 66 in a printing condition wherein the motion of the carriage creates forces which tend to cause the ink to be moved back and forth, or in a somewhat defined supply-and-return cycle, between the reservoirs 10 and 28. During printing conditions, i.e., when the printer is ready for actual printing of characters or the like and when the reservoir 28 along with the print head 72 are rapidly moving or reciprocating in the back-and-forth direction, the level of ink 12 in the local reservoir 28 is maintained approximately at or slightly above the level indicated at 90, which corresponds generally with the height of the outlet 44 and the end 42 of the tube 40 and which level is substantially below the level 92 of the ink 12 in the main reservoir 10.

When the printing operation ceases or when the reservoir 28 along with the print head 72 are not moving or reciprocating, as in the non-printing or rest condition, the ink 12 in the local reservoir 28 slowly rises above the height of the outlet 44 and may rise to a level indicated at 94, corresponding generally with the level 92 of ink 12 in the main reservoir 10 and approximately to or slightly below the height of the print head 72. In this respect, the ink levels 92 and 94 tend to be equalized and since the level of ink 12 in the reservoir 28 is above the outlet 44 thereof, the check valve 50 is responsive to the increasing level of ink in the reservoir 28 and allows flow of ink in the direction of the arrow, shown with the check valve 50, from reservoir 28 to reservoir 10. An alternate ink level 96 is shown as being slightly above the outlet 44 of the reservoir 28 wherein the ink level may attain an upper point of the operating range. When the ink level in local reservoir 28 is maintained between levels 90 and 96, no gas bubbles are present or created within the system.

It is seen that the system provides for simple self-pumping means with two distinct levels of ink in the ink reservoir 28 directly associated with the operation of the ink jet print head 72. The idle or non-printing level at 94 in the local reservoir 28 is approximately at print head height and the operating or printing level at 90 is about two inches lower or at approximately the height of the outlet 44 and of the return tube 40. The motion of the carriage 66, on which the print head 72 and the reservoir 28 are mounted, provides the driving force to pump the ink 12 from the main reservoir 10 to the local reservoir 28 and the check valve 50 ensures that the ink 12 moves only in the proper direction during certain conditions, all in a manner and arrangement wherein the ink level control is considered to be automatically controlled during both idle or non-printing periods and operating or printing periods.

The result of the ink supply system is that a circulating flow of ink is maintained or is taking place when the reservoir 28 moves back and forth in the printing operation. Since the local reservoir 28 moves in reciprocating manner relative to the main reservoir 10, acceleration of reservoir 28 away from reservoir 10 causes valve 50 to open and thereby permit flow of ink from reservoir 28 to reservoir 10, thus lowering the level of ink in reservoir 28. When the reservoir 28 accelerates back toward reservoir 10, the check valve 50 closes and there is no flow of ink from reservoir 28 to reservoir 10. Further, it is noted that when the ink in reservoir 28 is at the low level 90, the force of gravity causes a small flow of ink from reservoir 10 to reservoir 28, except during accelerating conditions. The net result is a substantially steady flow of ink 12 from reservoir 10 to reservoir 28 through the filter and constricting device 26, and a pulsating flow of ink 12 from reservoir 28 to reservoir 10 through the check valve 50.

It is seen that the constriction device 26 in the supply line to reservoir 28, the check valve 50 in the return line to reservoir 10, and the location of the inlet 44 for the return tube 40 all provide for and prevent unwanted surges in the ink 12 which are caused by the reciprocating motion of the carriage 66. If such surges were allowed to occur, the pressure in the moving reservoir 28 would suddenly change and cause ink to be unintentionally ejected from the nozzle 78 or to cause air to be ingested therein.

In an alternate system or modification of the above-described arrangement, the check valve 50 could be spring or gravity-loaded to control the differences in pressures between the two reservoirs 10 and 28 and thereby change the location of the flexible tubes 40 and 56 so that both tubes can be connected to inlets and outlets located at the bottom of the reservoirs.

In the case of a spring or weight-loaded check valve 50, the force tending to open the valve is the force on the ink 12 caused by the motion of the carriage 66, reduced by the spring force or weight of the ball and also the force caused by the difference in level between the two reservoirs 10 and 28. When the difference in the ink levels is sufficiently large, such ink level difference and the spring force or weight of the ball together balance the force due to carriage motion and under these conditions, the valve will not open to permit flow of ink therethrough. Thus, the level of ink 12 in the moving reservoir 28 will descend to a predetermined point and settle or stop thereat. In similar manner, as mentioned above, when the carriage and the reservoir are not moving, the ink level in reservoir 28 will slowly rise by flow of ink through the supply tubes 16 and 30 until the two reservoirs have approximately equal ink levels, or otherwise stated, the ink in the two reservoirs is at approximately the same height by reason of gravity. It should be noted that the distance between ink level 90 and ink level 94 in the reservoir 28 is in the range of 5–6 centimeters.

It is seen that the check valve 50 allows flow of the ink 12 from the local reservoir 28 to the main reservoir 10 only when the ink level in the reservoir 28 is at or slightly above the level of outlet 44. The reciprocating motion of the reservoir 28 creates the pumping forces which cause a negative pressure within the reservoir 28 and which cause the ink 12 to move back and forth between the two reservoirs, however the check valve 50 allows ink flow only in the indicated direction.

It is thus seen that herein shown and described is an ink jet printing system which controls the level of the ink during both printing conditions and non-printing conditions. A supply line and a return line for the ink are connected between a stationary reservoir and a reciprocating reservoir, and the ink is caused to flow by movement of the reciprocating reservoir to attain one level therein during printing and to allow the ink to rise in the reciprocating reservoir to another level therein when idle. The apparatus of the present invention enables the accomplishment of the objects and advantages mentioned above, and while a preferred embodiment has been disclosed herein, variations thereof may occur to those skilled in the art. It is contemplated that all such variations not departing from the spirit and scope of the invention hereof are to be construed in accordance with the following claims.

I claim:

1. Means for controlling the level of ink in an ink jet printing system comprising first means containing a quantity of ink, second means containing a quantity of ink, means providing an ink supply line and an ink return line connecting the first and the second ink containing means, means operably associated with said second containing means for ejecting ink in droplet form, means for moving said second containing means in reciprocating manner to thereby effect pumping of ink between the second and the first containing means, and means associated with the ink return line for permitting intermittent flow of ink therethrough from the second to the first containing means and establishing a first ink level in the second containing means during printing operation and for allowing flow of ink through the ink supply line from the first to the second containing means and establishing a second ink level in the second containing means during non-printing.

2. The subject matter of claim 1 including means associated with the ink supply line for damping the flow of ink to the second containing means.

3. The subject matter of claim 1 wherein the ink supply line and the ink return line are flexible tubes allowing movement of the second containing means in relation to the first containing means.

4. The subject matter of claim 1 wherein the ink flow permitting means comprises a normally-closed check valve actuated by pressure of ink therethrough.

5. The subject matter of claim 1 wherein the second containing means is a movable reservoir carrying the ink ejecting means.

6. The subject matter of claim 5 wherein the ink ejecting means is a tubular transducer.

7. The subject matter of claim 1 wherein the first containing means is a stationary reservoir.

8. The subject matter of claim 7 wherein the second containing means is a movable reservoir and said ink supply line includes means for damping the flow of ink from the stationary reservoir to the movable reservoir.

9. The subject matter of claim 7 wherein the second containing means is a movable reservoir and said ink flow permitting means comprises a check valve actuated by pressure of ink thereagainst to permit ink to flow through the return line from the stationary reservoir to the movable reservoir during movement thereof and actuated to permit flow of ink through the supply line from the stationary reservoir to the movable reservoir during non-movement thereof.

10. Ink level controlling means comprising a first reservoir containing a quantity of ink, a second reservoir containing a quantity of ink, means connecting the first and second reservoirs and providing ink supply and ink return lines therebetween, means for moving the second reservoir in reciprocating manner relative to the first reservoir to cause pumping of ink between the second and the first reservoir, and means operably associated with the ink return line for permitting intermittent flow of ink from the second to the first reservoir when the ink is at one level in the second reservoir during printing conditions and for allowing flow of ink from the first to the second reservoir when the ink is at another level in the second reservoir during non-printing conditions.

11. The subject matter of claim 10 wherein the ink supply line and the ink return line are flexible conduits permitting movement of the second reservoir relative to the first reservoir.

12. The subject matter of claim 10 including means associated with the ink supply line for restricting flow of and for filtering ink traveling from the first to the second reservoir.

13. The subject matter of claim 10 wherein the ink flow permitting means comprises a pressure actuated check valve actuated open by ink pressure thereagainst during reciprocating movement of the second reservoir.

14. The subject matter of claim 10 wherein said first reservoir is stationary and said second reservoir is movable and includes an elongated ink feed member therein.

15. The subject matter of claim 14 including a transducer operably associated with and carried by said elongated ink feed member for ejecting ink from the second reservoir in droplet form.

16. In an ink jet printer having a first reservoir of ink and a second reservoir of ink movable in relation to the first reservoir, means connecting the first and second reservoirs to provide an ink supply line and an ink return line therebetween, the improvement comprising means for causing the second reservoir to move in reciprocating manner during printing conditions and to cause intermittent flow of ink from the second reservoir into the first reservoir and maintain a predetermined level in the second reservoir, and means operably associated with the ink return line permitting the intermittent flow of ink from the second reservoir into the first reservoir when the level of ink in said second reservoir is at the predetermined level and for allowing flow of ink from the first to the second reservoir when the ink is at a higher level in the second reservoir during non-printing conditions.

17. In the printer of claim 16 including a transducer operably associated with and carried by said second reservoir for ejecting ink therefrom in droplet form.

18. In the printer of claim 16 wherein the operably associated means is a normally closed, pressure actuated check valve actuated open by increased ink pressure thereagainst during reciprocating movement of said second reservoir.

* * * * *